United States Patent
Watanabe

(10) Patent No.: US 9,533,917 B2
(45) Date of Patent: Jan. 3, 2017

(54) LIGHT-TRANSMITTING BISMUTH-SUBSTITUTED RARE-EARTH IRON GARNET-TYPE CALCINED MATERIAL, AND MAGNETO-OPTICAL DEVICE

(71) Applicant: SHIN-ETSU CHEMICAL CO., LTD., Tokyo (JP)

(72) Inventor: Toshiaki Watanabe, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/650,050

(22) PCT Filed: Dec. 2, 2013

(86) PCT No.: PCT/JP2013/007052
§ 371 (c)(1),
(2) Date: Jun. 5, 2015

(87) PCT Pub. No.: WO2014/087627
PCT Pub. Date: Jun. 12, 2014

(65) Prior Publication Data
US 2015/0315084 A1 Nov. 5, 2015

(30) Foreign Application Priority Data
Dec. 6, 2012 (JP) ................................. 2012-267281

(51) Int. Cl.
*C04B 35/26* (2006.01)
*G02F 1/09* (2006.01)
*G02B 1/00* (2006.01)
*G02F 1/00* (2006.01)
*C01G 49/00* (2006.01)

(52) U.S. Cl.
CPC ....... *C04B 35/2675* (2013.01); *C01G 49/0054* (2013.01); *C04B 35/26* (2013.01); *G02B 1/00* (2013.01); *G02F 1/0036* (2013.01); *G02F 1/09* (2013.01); *C01P 2002/77* (2013.01); *C01P 2004/61* (2013.01); *C01P 2004/62* (2013.01); *C01P 2006/42* (2013.01); *C01P 2006/60* (2013.01); *C04B 2235/3224* (2013.01); *C04B 2235/3225* (2013.01); *C04B 2235/3298* (2013.01); *C04B 2235/6567* (2013.01); *C04B 2235/764* (2013.01); *C04B 2235/785* (2013.01); *C04B 2235/786* (2013.01); *C04B 2235/9653* (2013.01); *Y10T 428/2982* (2015.01)

(58) Field of Classification Search
CPC .......... G02F 1/09; G02F 1/0036; C04B 35/26; C04B 35/2675; C01G 49/0054; G02B 1/00; Y10T 428/2982
USPC ...................... 428/402; 252/582; 359/484.02
See application file for complete search history.

(56) References Cited

U.S. PATENT DOCUMENTS 5,256,242 A * 10/1993 Imaeda ............... C01G 49/0018
117/6
5,691,837 A 11/1997 Itoh et al.
5,835,257 A 11/1998 Itoh et al.

FOREIGN PATENT DOCUMENTS

| EP | 0399665 A1 | 11/1990 |
|---|---|---|
| EP | 0732709 A1 | 9/1996 |
| JP | 63-259618 A | 10/1988 |
| JP | 63-260892 | * 10/1988 |
| JP | 63-260892 A | 10/1988 |
| JP | 2-289429 | * 11/1990 |
| JP | 2-289429 A | 11/1990 |
| JP | 3-164466 | * 7/1991 |
| JP | 3-164466 A | 7/1991 |
| JP | 6-279106 A | 10/1994 |
| JP | H0732706 A | 11/1995 |
| JP | 9-2867 A | 1/1997 |

OTHER PUBLICATIONS

International Search Report dated Feb. 25, 2014 issued in corresponding PCT/JP2013/007052 application (pp. 1-2) and English Translation thereof.
First Reason for Rejection in corresponding Taiwanese application 10420029010 with English translation.
Supplementary European Search Report for EP13860575 dated Jun. 13, 2016.
Huang, M. et al., "Improvements on Faraday Rotation Wavelength and Temperature Characteristics of TbYbBiIG Bulk Crystals in 1550nm Band," Japanese Journal of Applied Physics, Jun. 1, 2008, vol. 47, No. 6, pp. 4608-4611.
English Abstract of JPH07302706, Publication Date: Nov. 14, 1995.

\* cited by examiner

*Primary Examiner* — Leszek Kiliman
(74) *Attorney, Agent, or Firm* — Millen, White, Zelano, Branigan, P.C.

(57) ABSTRACT

A light-transmitting bismuth-substituted rare-earth iron garnet-type calcined body expressed by $R_{3-x}Bi_xYe_5O_{12}$ and having an average crystal particle diameter of 0.3-10 micrometers, and a magneto-optical device using said calcined body; wherein R is at least one kind of elements selected from a group consisting of Y and lanthanoids, and x is a number from 0.5 to 2.5.

16 Claims, 1 Drawing Sheet

LIGHT-TRANSMITTING BISMUTH-SUBSTITUTED RARE-EARTH IRON GARNET-TYPE CALCINED MATERIAL, AND MAGNETO-OPTICAL DEVICE

TECHNICAL FIELD

The present invention relates to a light-transmitting bismuth-substituted rare-earth iron garnet-type calcined material, and especially to such a light-transmitting bismuth-substituted rare-earth iron garnet-type calcined material having an average crystal particle diameter of 0.3-10 micrometers and also to a magneto-optical device whose magneto-optical element is made of the said calcined (sintered) material.

BACKGROUND ART

In optical communication and optical measurement, when the light emitted from a semiconductor laser reflects on the surfaces of devices arranged in the transmission path and returns to the semiconductor laser, the laser oscillation becomes unstable. To cope with this, an optical isolator has been used, which contains a Faraday rotator capable of non-reciprocally rotating a plane of polarization to thereby stop the returning light. Similarly, there has been used an optical circulator, which uses a Faraday rotator to control the travelling direction of lights depending on a communication path.

As the Faraday rotator, a bismuth-substituted rare-earth iron garnet film has conventionally been used, which is grown by the liquid phase epitaxial growth method (LPE method) over a garnet substrate (which is a substrate of $Gd_3Ga_5O_{12}$ or the same with one or two elements substituted, such as commercially available NOG (manufactured by Shin-Etsu Chemical Co., Ltd.) and SGGG (manufactured by Saint-Gobain).

However, for the reason that the composition of the film as grown is restricted by the lattice constant of the substrate, this manufacture method has problems such as: (1) freedom in designing the material composition such as the substitution amount by Bi is narrowed; (2) the configuration of the grown film is limited by the configuration of the substrate; and (3) an expensive platinum crucible in which the growth of the film is conducted and a platinum holder for supporting the substrate in the liquid phase are necessary.

Hence, there has been proposed a method wherein the film is grown through a solid phase reaction (Patent documents 1 and 2); however, in these inventions, although desired properties are achieved concerning to the Faraday rotation coefficient, the insertion loss and the extinction ratio were so insufficient that no practical application has been realized.

PRIOR ART DOCUMENTS

Patent Document

Patent document 1: J P H8(1996)-91998 A1
Patent document 2: J P S63(1988)-35490 A1

SUMMARY OF THE INVENTION

Problems to be Solved by the Invention

The present inventors strived hard so as to acquire a Faraday rotator having a sufficient insertion loss and a sufficient extinction ratio by a solid phase reaction method, and eventually they found that the reaction time of the solid phase reaction influences the resulting average size of the particles constituting the film material and also the extinction performance and insertion loss which occur within a wavelength range which is used in optical communication and optical measurement; they then found that by controlling the reaction time of the solid phase reaction it is possible to bring the extinction performance and the insertion loss into practically acceptable ranges (such as 35 dB or higher and 1.0 dB or lower, respectively) and hence possessed the invention.

Means to Solve the Problems

Thus the present invention is about a light-transmitting bismuth-substituted rare-earth iron garnet-type calcined material denoted by $R_{3-x}Bi_xFe_5O_{12}$ (wherein R is at least one kind of elements selected from a group consisting of Y plus lanthanoids, and x is a number from 0.5 to 2.5) and having an average crystal particle diameter (hereinafter, referred to as an average particle diameter) from 0.3 to 10 micrometers, and is also about a magneto-optical device whose magneto-optical element is made of said light-transmitting bismuth-substituted rare-earth iron garnet-type calcined material.

Effect of the Invention

The light-transmitting bismuth-substituted rare-earth iron garnet-type calcined material of the present invention is obtained through a solid phase reaction, and there is no need for using a costly platinum crucible in which the film is grown, or for using a platinum holder for supporting the substrate in a liquid phase. Therefore, the present invention has a special effect that the production cost is reduced, and what is more, since it is not necessary to use a special substrate for the film growth, a suitable existing manufacturing system can be used.

MODE FOR CARRYING OUT THE INVENTION

The details of the present invention will be described herein below on the basis of examples, but the present invention shall not be construed as being limited to them; and inventions that may be had by the skilled ones in this field through mere modification as a matter of design modification shall be construed as being within the reach of the present invention.

Example 1

As shown in Table 1 below, 22 kinds of combinations were prepared to try to make bismuth-substituted rare-earth iron garnet-type calcined test pieces; and each test piece was made into a form by cold isostatic pressing (CIP), and was then preliminarily calcined in a vacuum heating furnace (at 1050 to 1200° C. for 20 to 40 hours). Next the product was subjected to a hot isostatic pressing (HIP) at temperatures of 1150-1460° C. so as to obtain a black-color sintered body having a diameter (φ) of 10 mm and a thickness (t) of 2 mm.

TABLE 1

Test Piece Compositions

| R elements | Bi-substitution amount x | | | | | | |
|---|---|---|---|---|---|---|---|
| | 0.5 | 1 | 1.5 | 2 | 2.5 | 2.8 | 3 |
| Y | 1) | 2) | 3) | 4) | 5) | 6) | 7) |
| Eu |  | 8) |  |  |  |  |  |
| Gd |  | 9) | 10) | 11) |  |  |  |
| Tb |  | 12) | 13) | 14) | 15) |  |  |
| Ho |  |  | 16) |  |  |  |  |
| Yb |  |  |  | 17) | 18) | 19) |  |
| Lu |  |  |  | 20) | 21) |  |  |
| GdTb (1:1) |  |  |  | 22) |  |  |  |

Figure 3:
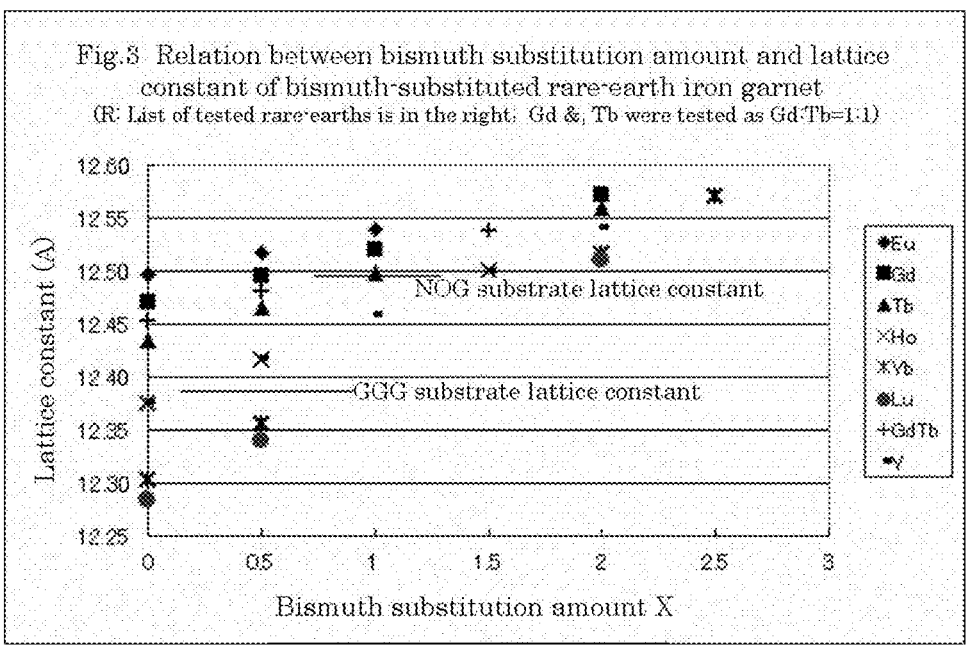
FIG. 3 is a graph showing relationships between the bismuth substitution amount and the lattice constant in the case of the bismuth-substituted rare-earth iron garnet-type calcined material of the present invention.

Each test piece was subjected to a both-face polishing, and by means of an X-ray diffractometer it was confirmed that all the test pieces had a garnet structure denoted by $R_{3-x}Bi_xFe_5O_{12}$ (See, Tables 2, 3 and FIG. 3.). In the above denotation, R is at least one kind of elements selected from a group consisting of Y plus lanthanoids, and x is a number from 0.5 to 2.5.

TABLE 2

Assessment of garnet structure ("•" denotes garnet structure only. "x" denotes contamination with other structure(s))

| R elements | Bi-substitution amount x | | | | | | |
|---|---|---|---|---|---|---|---|
| | 0.5 | 1 | 1.5 | 2 | 2.5 | 2.8 | 3 |
| Y | • | • | • | • | x | x | x |
| Eu |  | • |  |  |  |  |  |
| Gd |  | • | • | • |  |  |  |
| Tb |  | • | • | • | x |  |  |
| Ho |  |  | • |  |  |  |  |
| Yb |  |  |  | • | • | x |  |
| Lu |  |  |  | • | x |  |  |
| GdTb (1:1) |  |  |  | • |  |  |  |

TABLE 3

Lattice constants of garnet substrates

| | Lattice constant (Å) |
|---|---|
| GGG substrate ($Gd_3Ga_5O_{12}$ substrate) | 12.383 |
| NOG substrate (manufactured by Shin-Etsu Chemical Co., Ltd.) | 12.497 |
| SGGG substrate (manufactured by Saint-Gobain) | 12.496 |

(Garnet substrates commonly used in the LPE method and their lattice constants.)

As is clear from Table 2 and FIG. 3, it was confirmed, with respect to the bismuth-substituted rare-earth iron garnet-type calcined (sintered) material of the present invention, that it is possible to obtain 2-mm-thick garnet structures even in the cases where x=1.5 or, 2.0 or 2.5, wherein it has not been possible to grow a thick film by means of the conventional LPE method using a [conventional] garnet substrate, owing to the constraint imposed by the lattice constant of the substrate.

Example 2

Figure 1:
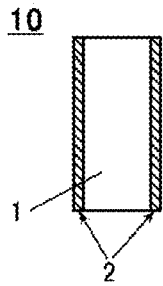
FIG. 1 shows an example of a structure of the Faraday rotator of the present invention.

The calcined bodies of $Gd_{1.5}Bi_{1.5}Fe_5O_{12}$ of (φ) 10 mm×(t) 1.2 mm obtained in Example 1, were subjected to an additional heat calcination at 1200 to 1350° C., and both faces thereof were polished and etched; then, the particle diameter was measured. Next, each work (polished calcined body) was further polished until the thickness became such a value at which the Faraday rotational angle was 45 degrees. An anti-reflective coating (AR coating) effective to a light having a wavelength of 1310 nm in the air is applied to both faces of the work (See, FIG. 1.), and the Faraday rotational angle (the Faraday rotation coefficient, which is a rotational angle divided by a unit length), the extinction performance, and the insertion loss of each work were measured.

The average particle diameter was calculated based on the data obtained by first etching the surface of the work, then observing its SEM image to identify the number of particles on any arbitrary straight line, and repeating this observation three times. The result is shown in Table 4.

TABLE 4

Properties in the case of composition of $Gd_{1.5}Bi_{1.5}Fe_5O_{12}$

| Additional heat calcination conditions | | | Optical properties at 25° C., 1310 nm | | |
|---|---|---|---|---|---|
| Calcination temperature (° C.) | Calcinination hours (h) | Average particle diameter (μm) | Insertion loss ✻ (dB) | Extinction ratio (dB) | Faraday rotation coefficient (deg/cm) |
| 1220 | 1 | 0.3 | 0.6 | 42 | −2640 |
| 1240 | 5 | 3.5 | 0.2 | 41 | −2680 |
| 1280 | 5 | 6 | 0.5 | 43 | −2680 |
| 1320 | 5 | 10 | 0.8 | 38 | −2670 |
| 1350 | 10 | 12 | 1.3 | 34 | −2690 |

✻ per 45 deg.

Example 3

The data shown in Table 5 were obtained in the same procedure as the one used in the above Example 2, except that in place of the calcined body of $Gd_{1.5}Bi_{1.5}Fe_5O_{12}$ of (φ) 10 mm×(t) 2 mm, which was obtained in Example 1, a calcined body of $Tb_{1.5}Bi_{1.5}Fe_5O_{12}$ of (φ) 10 mm×(t) 2 mm, which was also obtained in Example 1, was used.

TABLE 5

Properties in the case of composition of $Tb_{1.5}Bi_{1.5}Fe_5O_{12}$

| Additional heat calcination conditions | | | Optical properties at 25° C., 1310 nm | | |
|---|---|---|---|---|---|
| Calcination temperature (° C.) | Calcinination hours (h) | Average particle diameter (μm) | Insertion loss ✻ (dB) | Extinction ratio (dB) | Faraday rotation coefficient (deg/cm) |
| 1200 | 1 | 0.4 | 0.4 | 40 | −2540 |
| 1240 | 5 | 4 | 0.3 | 41 | −2550 |
| 1280 | 5 | 7 | 0.6 | 40 | −2530 |
| 1320 | 5 | 9.8 | 0.7 | 39 | −2550 |
| 1350 | 10 | 15 | 1.5 | 33 | −2570 |

✻ per 45 deg.

Example 4

In order to assess the influence of the calcination time on the particle diameter and the performance, the same additional heat calcination which was conducted at 1200° C. in Example 3 was conducted for 5 hours, 10 hours and 15 hours, and the data shown in Table 6 were obtained.

TABLE 6

Properties in the case of composition of $Tb_{1.5}Bi_{1.5}Fe_5O_{12}$

| Additional heat calcination conditions | | Optical properties at 25° C., 1310 nm | | | |
| --- | --- | --- | --- | --- | --- |
| Calcination temperature (° C.) | Calcination hours (h) | Average particle diameter (μm) | Insertion loss ※ (dB) | Extinction ratio (dB) | Faraday rotation coefficient (deg/cm) |
| 1200 | 0 | 0.4 | 0.4 | 40 | −2540 |
| 1200 | 5 | 1.6 | 0.15 | 42 | −2550 |
| 1200 | 10 | 2.5 | 0.18 | 42 | −2560 |
| 1200 | 15 | 4 | 0.3 | 41 | −2540 |

※ per 45 deg.

Example 5

The data shown in Table 7 were obtained in the same procedure as the one used in the above Example 4, except that in place of the calcined body of $Tb_{1.5}Bi_{1.5}Fe_5O_{12}$, which was used in Example 4, a calcined body of $Gd_{1.5}Bi_{1.5}Fe_5O_{12}$ was used.

TABLE 7

Properties in the case of composition of $Gd_{1.5}Bi_{1.5}Fe_5O_{12}$

| Additional heat calcination conditions | | Optical properties at 25° C., 1310 nm | | | |
| --- | --- | --- | --- | --- | --- |
| Calcination temperature (° C.) | Calcination hours (h) | Average particle diameter (μm) | Insertion loss ※ (dB) | Extinction ratio (dB) | Faraday rotation coefficient (deg/cm) |
| 1220 | 0 | 0.3 | 0.6 | 42 | −2640 |
| 1220 | 5 | 0.8 | 0.14 | 43 | −2690 |
| 1220 | 10 | 2.3 | 0.16 | 43 | −2680 |
| 1220 | 15 | 3.8 | 0.3 | 41 | −2680 |

※ per 45 deg.

As is seen from the results appearing in Table 5 and Table 6, it was confirmed that the average particle diameter varies depending on the calcination time length even if the temperature is kept constant. Also, as is seen from the comparisons among Tables 4 and 6, and Tables 5 and 7, it was found that there is a relationship among the average particle size and the insertion loss and also the extinction ratio, therefore, in order to obtain a result of insertion loss being 1.0 dB or lower and the extinction ratio being 35 dB or higher, it is necessary that the average particle diameter is from 0.3 to 10 micrometers.

Example 6

A 5-hour-long additional heat calcination was conducted in the same manner as in Example 5, except that the AR coating which is effective to a light having a wavelength of 780 nm in the air was adopted. The results obtained are shown in Table 8.

TABLE 8

Properties in the case of composition of $Gd_{1.5}Bi_{1.5}Fe_5O_{12}$

| Heat calcination conditions | | Optical properties at 25° C., 1310 nm | | | |
| --- | --- | --- | --- | --- | --- |
| Calcination temperature (° C.) | Calcination hours (h) | Average particle diameter (μm) | Insertion loss ※ (dB) | Extinction ratio (dB) | Faraday rotation coefficient (deg/cm) |
| 1220 | 5 | 0.8 | 0.14 | 43 | −2690 |

⇒ at 780 nm, 45 deg: 1.5 dB/43 dB (−12000 deg/cm)

Example 7

Figure 2:
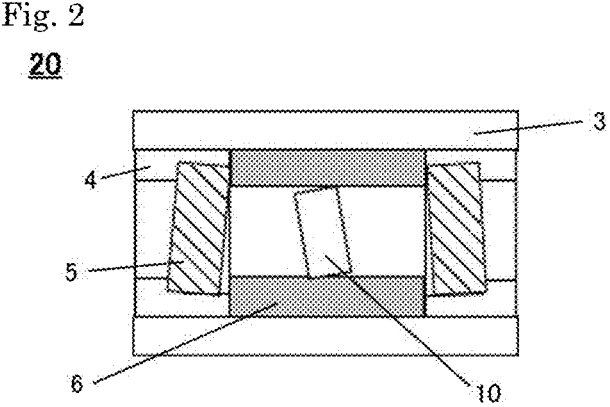
FIG. 2 shows a structure of an optical isolator of the present invention.

Of the works obtained, the one of which the insertion loss was the smallest was picked (the one which was additionally calcined at 1220° C. for 5 hours in Table 7), and it was polished until its thickness became 168 micrometers when the Faraday rotational angle against the light of 1310 nm wavelength became 45 degrees. Then both faces of it were applied with an AR coating and the work was cut to a 1-mm square piece, which was inserted and fixed in a magnet made of samarium-cobalt. Two works wherein a polarizing glass piece was fitted immovably in a metallic holder were prepared, and they were attached on each end of the magnet in a manner such that the relative angle, which is created by the directions of polarized light transmitted the polarizing glass, became 45 degrees to make an optical isolator. This optical isolator was inspected and it showed good results, namely, the insertion loss of the light travelling in the forward direction was 0.25 dB and that in the opposite direction was 39 dB (See, FIGS. 1 and 2.). Now, the relative angle of 45 degrees means that, when viewed from the incident side of the isolator toward the emitting side, the transmission polarizing direction of the polarizing glass on the incident side and that on the emitting side form an angle of 45 degrees between them as measured counter-clockwise.

Similarly, the work was polished until its thickness became 250 micrometers when the Faraday rotational angle against the light of 1550 nm wavelength became 45 degrees; then both faces of it were applied with an AR coating and the work was cut to a 1-mm square piece, which was inserted and fixed in a magnet made of samarium-cobalt; then a polarizing glass piece was fitted immovably to both ends of the magnet in a manner such that the relative angle became 45 degrees, and thus an optical isolator was made. The inspection result was good, namely, the insertion loss of the light travelling in the forward direction was 0.20 dB and that in the opposite direction was 38 dB.

Example 8

Of the works obtained, the one of which the Faraday rotation coefficient was the highest was picked (The product experienced additional calcination at 1220° C. for 5 hours in Table 7.), and it was polished until its thickness became 38 micrometers when the Faraday rotational angle against the light of 780 nm wavelength became 45 degrees, and both faces of it were applied with an AR coating. Then the work was cut to a 1-mm square piece, and using it an optical isolator tailored for 780-micrometer wavelength was made in the same manner as in Example 3. This optical isolator was inspected and it showed good results, namely, the insertion loss of the light travelling in the forward direction was 1.8 dB and that in the opposite direction was 42 dB.

It is noted that, compared with a work obtained through the manufacture by the conventional LPE method, the Faraday rotator of the present invention tends to show somewhat higher insertion loss. It is thought that this is caused by a change in valence of some of Fe ions in the garnet composition changes from $Fe^{3+}$ to $Fe^{4+}$ or $Fe^{2+}$ or the like. It is therefore assumed to be able to keep the insertion loss lower by modifying the valence of the Fe ion through annealing of the work substance in a gaseous atmosphere or by initially adding to the starting composition an element capable of suppressing the change in the valence of the Fe ion. It is also thought to be able to control the saturated magnetic field strength as of the ex-manufacturing composition by the general procedures commonly employed in the LPE method such as substitution of Fe sites with Al, Ga or the like. The average particle diameter can be controlled with adjustment of the calcination temperature and/or calcination time, as conducted in the present example, or it is also possible to control it by adding among the starting composition elements a trace amount of element such as Si, Ge, Al and Zr, which influences the average particle diameter as of the time of making the transparent ceramic body.

INDUSTRIAL APPLICABILITY

With the material composition of the light-transmitting bismuth-substituted rare-earth iron garnet-type calcined body of the present invention, it is possible to easily form a large-sized plate of it (e.g., 100×200 mm) due to the freedom from the necessity of taking into consideration such things as the lattice constant and size of the substrate, so that it has become possible to produce, at a high productivity, such magneto-optical devices which nonreciprocally rotate optical polarization planes such as the Faraday rotator, the optical isolator and the optical circulator, which are used in optical communication and optical measurement; hence the present invention has a high utility in such industries.

EXPLANATION OF LETTERS OR NUMERALS

1 Bismuth-substituted rare-earth iron garnet-type calcined body
2 Anti-reflective coating (AR coating)
3 SUS (stainless) ring
4 Polarizing glass holder
5 Polarizing glass
6 Magnet
10 Faraday rotator
20 Optical isolator

The invention claimed is:

1. A magneto-optical device comprising a magneto-optical element which is a light-transmitting bismuth-substituted rare-earth iron garnet-type calcined body expressed by the formula $R_{3-x}Bi_xFe_5O_{12}$ and having an average crystal particle diameter of 0.3-10 micrometers; wherein R is at least one kind of elements selected from a group consisting of Y and lanthanoids, and x is a number from 0.5 to 2.5,
wherein, in response to a 1310-nm-wavelength light, said light-transmitting bismuth-substituted rare-earth iron garnet-type calcined body causes the light, in a forward direction, to have an insertion loss of 1.0 dB or lower and an extinction ratio of 35 dB or higher.

2. The magneto-optical comprising a magneto-optical element which is a light-transmitting bismuth-substituted rare-earth iron garnet-type calcined body expressed by the formula $R_{3-x}Bi_xFe_5O_{12}$ and having an average crystal particle diameter of 0.3-10 micrometers; wherein R is at least one kind of elements selected from a group consisting of Y and lanthanoids, and x is a number from 0.5 to 2.5,
wherein, in response to a 1550-nm-wavelength light, said light-transmitting bismuth-substituted rare-earth iron garnet-type calcined body causes the light, in a forward direction, to have an insertion loss of 1.0 dB or lower and an extinction ratio of 35 dB or higher.

3. A method for manufacturing the light-transmitting bismuth-substituted rare-earth iron garnet-type calcined body comprising:
producing a calcined body expressed by the formula $R_{3-x}Bi_xFe_5O_{12}$, wherein R is at least one element selected from Y and lanthanoids and x is a number from 0.5 to 2.5, having an average crystal particle diameter of 0.3 to 10 μm, and
modifying a valence of Fe ion of said calcined body produced by (a) annealing the calcined body in a gaseous atmosphere, and/or (b) in producing said calcined body, initially adding at least one element which can suppress the change in the valence of the Fe ion in the calcined body.

4. The method for according to claim 3, wherein, in response to a 1310 nm-wavelength light or a 1550 nm-wavelength light, said light-transmitting bismuth-substituted rare-earth iron garnet-type calcined body expressed by the $R_{3-x}Bi_xFe_5O_{12}$ causes the light, in a forward direction, to have an insertion loss of 1.0 dB or lower and an extinction ratio of 35 dB or higher.

5. The method for according to claim 3, wherein a valence of Fe ion of said calcined body produced is modified by annealing said calcined body in a gaseous atmosphere.

6. The method for according to claim 3, wherein a valence of Fe ion of said calcined body produced is modified by, in producing said calcined body, initially adding at least one element which can suppress the change in the valence of the Fe ion in the calcined body.

7. The method for according to claim 3, wherein said calcined body is produced by cold isostatic pressing to form a body, then preliminarily calcining the body under vacuum at 1050 to 1200° C. for 20 to 40 hours, then subjecting the body to hot isostatic pressing at 1150-1460° C., and then subjecting the body to an additional heat calcination at 1200 to 1320° C. for 1 to 5 hours.

8. The method for according to claim 3, wherein said calcined body is produced by cold isostatic pressing to form a body, then preliminarily calcining the body under vacuum at 1050 to 1200° C. for 20 to 40 hours, then subjecting the body to hot isostatic pressing at 1150-1460° C., and then subjecting the body to an additional heat calcination at 1200 for 1 to 15 hours.

9. The magneto-optical device as claimed in claim 1, wherein R is Y, Eu, Gd, Tb, Ho, Yb, Lu, or a combination of Gd and Tb.

10. The magneto-optical device as claimed in claim 1, wherein x is a number from 1.0 to 2.5.

11. The magneto-optical device as claimed in claim 1, wherein x is a number from 1.0 to 2.0.

12. The magneto-optical device as claimed in claim 1, wherein x is a number from 1.5 to 2.5.

13. The magneto-optical device as claimed in claim 1, wherein, in response to a 1310-nm-wavelength light, said light-transmitting bismuth-substituted rare-earth iron garnet-type calcined body causes the light, in a forward direction, to have an insertion loss of 1.0 dB or lower.

14. The magneto-optical device as claimed in claim 1, wherein, in response to a 1310-nm-wavelength light, said light-transmitting bismuth-substituted rare-earth iron garnet-type calcined body causes the light, in a forward direction, to have an extinction ratio of 35 dB or higher.

15. The magneto-optical device as claimed in claim 2, wherein, in response to a 1550-nm-wavelength light, said light-transmitting bismuth-substituted rare-earth iron garnet-type calcined body causes the light, in a forward direction, to have an insertion loss of 1.0 dB or lower.

16. The magneto-optical device as claimed in claim 2, wherein, in response to a 1550-nm-wavelength light, said light-transmitting bismuth-substituted rare-earth iron garnet-type calcined body causes the light, in a forward direction, to have an extinction ratio of 35 dB or higher.

* * * * *